US011396426B2

(12) United States Patent
Kunc et al.

(10) Patent No.: US 11,396,426 B2
(45) Date of Patent: Jul. 26, 2022

(54) WAREHOUSE RACK SYSTEM

(71) Applicant: PPUH Zrembud w Cieszynie Sp. z o. o., Cieszyn (PL)

(72) Inventors: Tomasz Kunc, Cieszyn (PL); Jacek Dolata, Wierzyce (PL)

(73) Assignee: PPUH Zrembud w Cieszynie Sp. z o. o., Cieszyn (PL)

( * ) Notice: Subject to any disclaimer, the term of this patent is extended or adjusted under 35 U.S.C. 154(b) by 306 days.

(21) Appl. No.: 16/514,272

(22) Filed: Jul. 17, 2019

(65) Prior Publication Data
US 2020/0048002 A1 Feb. 13, 2020

(51) Int. Cl.
B65G 1/137 (2006.01)
B65G 1/04 (2006.01)
B65G 1/06 (2006.01)

(52) U.S. Cl.
CPC ......... B65G 1/1373 (2013.01); B65G 1/0492 (2013.01); B65G 1/065 (2013.01)

(58) Field of Classification Search
CPC combination set(s) only.
See application file for complete search history.

(56) References Cited

U.S. PATENT DOCUMENTS

| 2004/0234364 | A1* | 11/2004 | Ehrenleitner | ........ | B65G 1/0407 |
| | | | | | 414/281 |
| 2020/0122925 | A1* | 4/2020 | Abou-Chakra | ........ | B65G 1/065 |
| 2020/0172334 | A1* | 6/2020 | Yamashita | ........... | B65G 1/0414 |

FOREIGN PATENT DOCUMENTS

RU 59480 12/2006

* cited by examiner

Primary Examiner — Kyle O Logan
(74) Attorney, Agent, or Firm — John Alumit

(57) ABSTRACT

A system of warehouse racks placed perpendicularly to a working aisle. After selecting a place of storage of a given product, at least one rack is moved to the working aisle. The goods are placed or removed from the indicated place in the rack, and then the rack is moved to an initial position. The movement of the rack to the working aisle and its return to its initial position is made by movable, shared platform moving under at least one row of racks that is perpendicular to the direction of movement of the rack and parallel to the working aisle. The system includes a drive system, a power supply system, at least one running gear, a rack lifting system and a positioning system extending or retracting the rack. During movement to the working aisle and return to the initial position, the rack is lifted above the ground surface by the positioning system of the shared platform.

17 Claims, 3 Drawing Sheets

WAREHOUSE RACK SYSTEM

BACKGROUND

Figure 1:
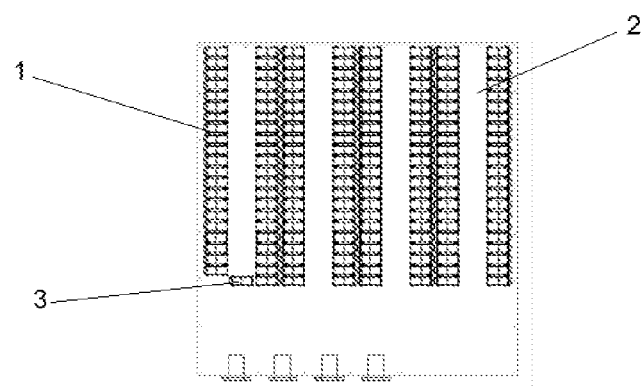

The object of the invention is a system of warehouse racks used in logistics.

Known and disclosed solutions for warehouse systems include standard in-row racks as well as alternative systems such as flow racks or racks in which a "shuttle" (automatic rack trolley) is used. There are also known the so-called "double deep" rack warehouse systems which increase the ratio of space occupied by the racks to the working space of the warehouse.

In the description of the utility model Ru.59480, a mobile rack was disclosed which facilitates installation on existing floors and obtaining the required spacing of shelves, as well as allows to increase total length of shelves and improve the quality of the rack operation. In the rack, according to the disclosed utility model, the front section, middle sections and the rear section are provided with strips, in the form of channel bars, supporting the shelves, as well as with shelf brackets, the front segment has two columns of shelves and a front wall in the form of double-leaf doors, the track structure is equipped with adjusting screws for its levelling after it has been laid on the existing floor and both axles of the front section and the middle section are equipped with sprockets and driven. The supporting strips have on their length a vertical row of small scale holes in which the catches of shelf brackets are mounted, determining in a stepwise manner the desired mutual distance of the shelves. The mobile rack is used for archiving, periodical storage and warehousing of files, documents, publications and goods and is used in archives, libraries, banks, offices, institutions, wholesalers, shops and plants.

The Polish patent application P.418251 disclosed a method for the storage of materials on in-row racks used in logistics. Drawer racks, on the one hand, combine all the advantages of warehouse systems used so far while eliminating their disadvantages, allowing to increase the amount of stored goods in the same storage area and requiring no major rework of warehouse space. They are perfect for storing both bulky goods and general cargo. The idea behind the invention is to apply drawer-type storing of materials using a modified racking system based on the use of single sections of in-row systems turned round by 90 degrees, arranged perpendicularly to the working aisle next to each other. The depth of the rack block and the number of storage levels are adjusted to the users' requirements.

The use of racking systems known from the state of the art makes it impossible to increase the storage area of goods in the designated area without expanding the warehouses or interfering with the structures of existing warehouse buildings.

It was therefore necessary to develop a storage system which would significantly increase the storage area of goods in relation to the systems known from the state of the art and which could be used in existing and new facilities for storing both bulky goods and general cargo.

The aim of the invention was to provide a system for storing goods in storage spaces which would increase both the amount of stored goods, but would also have a positive impact on the speed of loading and unloading goods at a previously selected place in the rack, while not interfering with the structure of warehouse buildings.

SUMMARY

The essence of the invention is a system of warehouse racks in which warehouse racks are placed perpendicularly to the working aisle, whereby after selecting a place of storage of a given product, at least one rack is moved to the working aisle, where the goods are placed or removed from the indicated place in the rack, and then the rack is moved to the initial position, characterized in that the movement of the rack to the working aisle and its return to its initial position is made by movable, shared platform moving under at least one row of racks—perpendicular to the direction of movement of the rack, parallel to the working aisle and which includes a drive system, a power supply system, at least one running gear, a rack lifting system and a positioning system extending or retracting rack, whereby during movement to the working aisle and return to the initial position, the rack is lifted above the ground surface by the lifting system of the shared platform.

Preferably, one pair of legs of the rack is shorter and placed on the levelling element, while the other pair of legs at the working aisle is set on the ground.

Preferably, the levelling element is a bracket arranged along a row of racks.

Optionally, two racks from adjacent rows can be placed on the levelling element.

Preferably, a guide rail of the shared platform is disposed in front of the levelling element.

Optionally, the levelling element is the guide rail of the shared platform.

Preferably, the shared platform power supply is a battery or a supercapacitor or a power strip or a busbar or power cable in the guide.

Preferably, the rack lifting system is in the form of hydraulic cylinders or in the form of a crank or knee or eccentric or screw mechanism or a wheel with a gear rack. Optionally, on the shared platform, there is a hydraulic pump driven by an electric motor.

Preferably, the shared platform has two running gears, the first of which allows the movement of the shared platform under the racks, while the second running gear allows the rack to exit to the working aisle and enter the initial position. The wheels are made of plastic or rubber or steel.

In a preferred embodiment, the first running gear enabling the movement of the shared platform under the racks is driven by a hydraulic motor.

Preferably, each of the running gears has a separate drive.

Preferably, the positioning system of the shared platform extending or retracting the selected rack is in the form of a hydraulic motor driving the sprocket wheel of the extending mechanism.

Preferably, the positioning system of the shared platform consists of a telescopic hydraulic double-acting cylinder Furthermore, preferably, the shared platform includes a distance sensor and/or a proximity sensor and/or a pressure sensor and/or security scanners.

Optionally, the safety scanners are mounted on extendable arms mounted on a shared platform and slide outwards on both sides of the rack when the rack is pulled out and retract under the rack when the rack is returned to its initial position.

The warehouse rack system according to the invention allows to maximize the used warehouse space without the need to interfere in the structure of the building. This greatly facilitates the adaptation of existing buildings/warehouses and the replacement of existing racks with the rack system according to the invention.

By using the system according to the invention, the problem of storing goods in storage spaces has been solved without the need to build a system of wide transport routes and complex and costly interference in the warehouse infrastructure. Furthermore, with the help of the system according to the invention, it is possible to easily adapt the current free space in the company to the storage needs or vice versa. The system according to the invention allows for an easy, temporary adaptation to the changing demand for storage space by expanding or reducing it by additional racks.

In the system according to the invention, the racks will be extended through a shared platform perpendicular to the working aisle, which will allow direct access and unloading/loading of the goods without the need to change the direction of movement immediately before and after, as well as during the operation. The perpendicular extension of the racks to the working aisle also provides access to several dozen pallet slots at the same time. The depth of the rack block and the number of storage levels are adjusted to the users' requirements.

The term "shared platform" means a platform that moves under a given row of racks and after selecting a storage location on a selected rack—pulls it out in order to take out or place the goods, and then pushes the rack to the initial location.

The power supply system used in the shared platform can be one of the following: well-known and commercially available DC power supply systems, wires, busbars, or also batteries or supercapacitors. The use of the latter also enables energy recovery, which may positively affect the operation of the whole system and will reduce situations in which the platform cannot slide out, because there is not enough energy stored in the power source.

The shared platform moves under the racks and perpendicular to them and can handle the row of racks above it. It can also slide under adjacent rows of racks.

The possibility of using a shared platform between rows of racks allows to continue work in case of failure of one of the shared platforms or to limit their number when one shared platform will be used for several rows of racks.

The rack lifting system is a system of cylinders placed on the platform which, after the platform is driven up to the selected rack, lift the rack above the ground, while extending the second running gear allowing for the transfer of larger loads and extending of the platform with the rack to the working aisle and its return to the initial position of the rack. After returning to the initial position, the rack is placed on the ground.

In the case of storage of goods of relatively small dimensions, there is no need to interfere with the structure of warehouse buildings. In the case of larger dimensions, the system according to the invention further comprises a positioning system for the shared platform which preferably consists of a telescopic double-acting hydraulic cylinder and a locking/supporting element, as well as a rail placed under the platform along a row of racks that supports the rectilinear movement of the shared platform under the racks and enables stable support for the system positioning the shared platform. The telescopic cylinder supports the uniform movement, without unfavourable deviations, of the shared platform with a raised rack to the working aisle or to the initial position.

The type and structure of racks used in the system according to the invention will depend on the type of stored goods (size, weight). However, in the system according to the invention, racks can be used whose first shelf is at a height allowing free passage of the shared platform, they are known from the state of the art and already used in warehouses of various applications.

The shared platform is in the form of welded or bolted steel elements or made of other material that allows the transfer of loads assumed in a given facility, equipped with at least one running gear.

In the system according to the invention, the width of the working aisles is not less than the length of the rack. This allows, on the one hand, the rack to be ejected through the shared platform to such an extent that it is possible to have free access to each part of the ejected rack, and on the other hand, it allows to limit the working place—where the goods are stored in a chosen place in the rack or picked up—to the necessary minimum.

In the system according to the invention, both the racks and the shared platform can be provided with various types of sensors—a motion sensor, a pressure sensor, a distance sensor, a proximity sensor—that make up the security system. This system allows automatic stopping of the rack ejection or retraction process in case of detecting any obstacle or presence of a human being. The sensors that make up the security system will be directly connected to the drive system and the warehouse IT system (e.g. WMS—Warehouse Management System).

Furthermore, the system according to the invention will ultimately be provided with IT systems known in the state of the art, e.g. the above-mentioned WMS. It is not necessary to change the existing IT warehouse systems.

DRAWINGS

Figure 2:
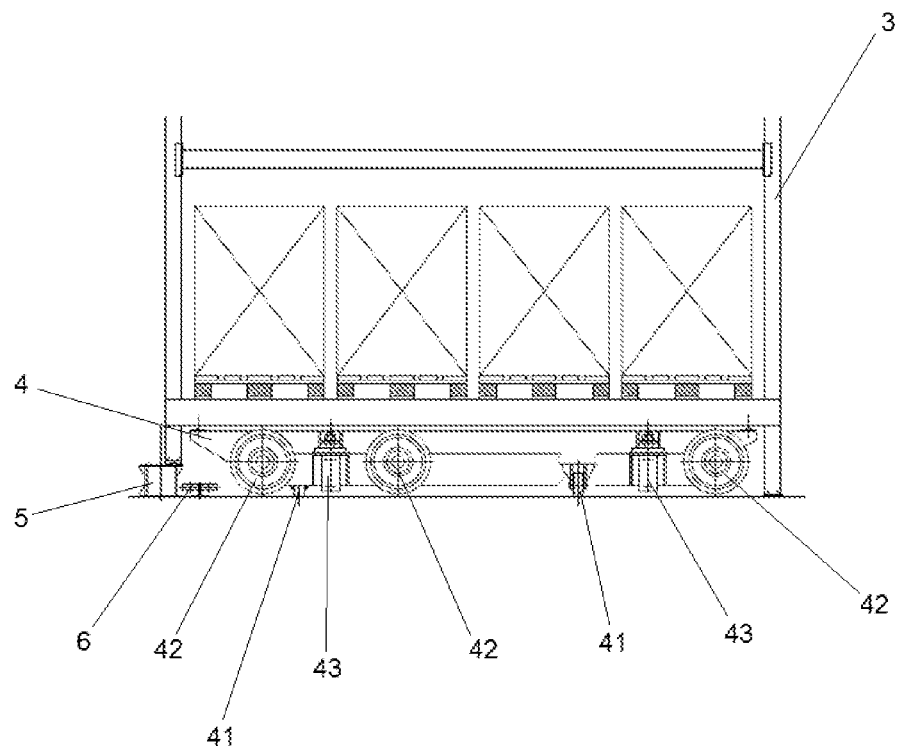
Figure 3:
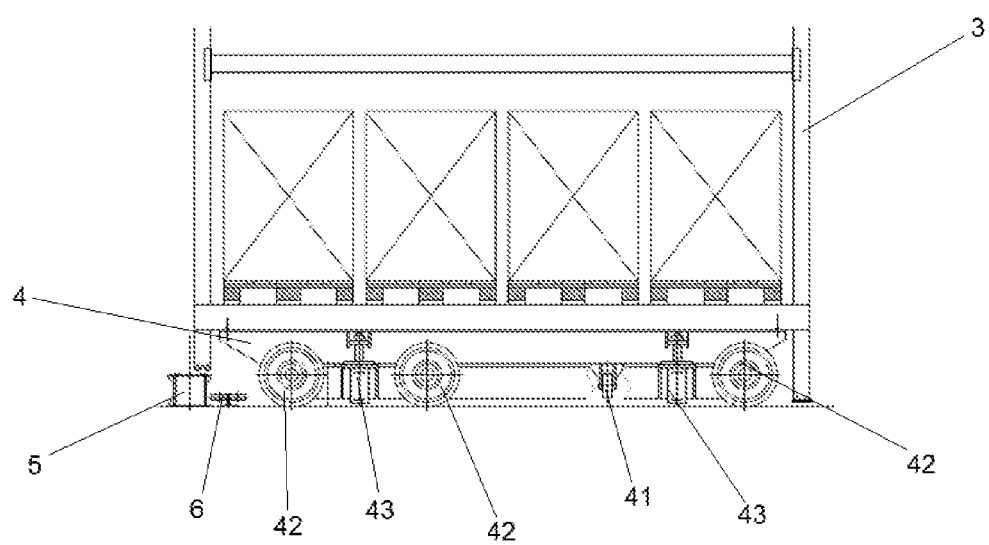
Figure 4:
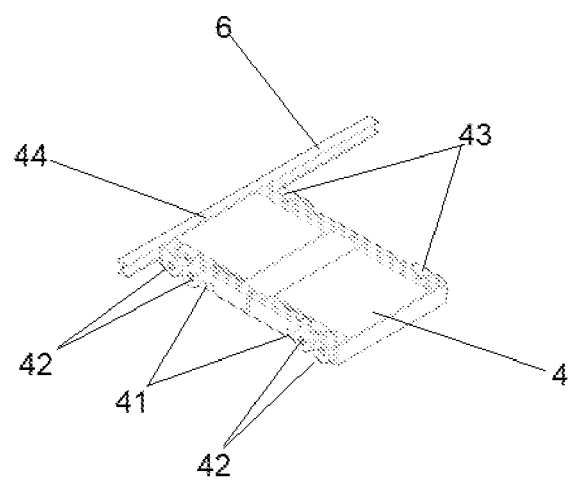
Figure 5:
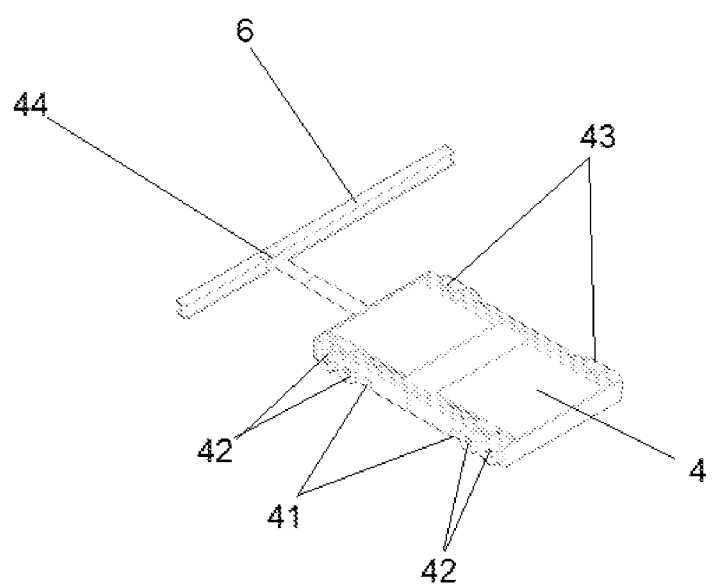

The system according to the invention is presented in preferable embodiments on the drawing, where the respective figures represent:

FIG. 1 presents a series of racks and a working aisle;

FIG. 2 presents a shared platform under a selected rack;

FIG. 3 presents a shared platform with a raised rack;

FIG. 4 presents a shared platform with a positioning system in the retracted position;

FIG. 5 presents a shared platform with a positioning system in the extended position;

DESCRIPTION

In the first stage, the storage location of the unit is indicated based on the information from the master system or the customer's system for identifying storage locations. The most frequently used is the Warehouse Management System which enables error-free location of goods in the warehouse and control of warehouse turnover. FIG. 1 shows the row of racks 1 and the working aisle 2 where the goods are placed on the selected place in the rack 3 or the goods are taken from the rack 3. Putting the goods on a chosen place or removing it from a specific place in the rack 3 takes place through drawing up of the shared platform 4 for the selected rack 3, then after the second running gear 42 is extended to enable the platform 4 to exit to a working aisle 2 and after rack 3 is lifted by a hydraulic system, the shared platform 4 together with rack 3 leaves to the working aisle 2, which is also shown in FIG. 1. The working aisle 2 is at least as wide as the length of the shared platform 4. After the selected rack 3 is pulled out on the shared platform 4 and the goods are stored in the selected place in rack 3, the shared platform 4 with the rack 3 is pushed into the initial position and the rack 3 is placed on the ground.

FIG. 2 shows the shared platform 4 under the selected rack 3. The rack 3 has one pair of legs shorter and placed on the levelling element 5 which compensates for height differences of legs of the rack 3 and is placed on the side opposite to the working aisle 2. This difference is necessary to enable access of the positioning system 44 that positions the shared platform 4 to the rail 6 placed in front of levelling element 5. In addition, the shared platform 4 includes two running gears. The first running gear 41 allows the shared platform 4 to pass under the row of racks 1 and stop it under the selected rack 3. The second running gear 42 enables the shared platform 4 with the rack 3 to exit into the working aisle 2. In FIG. 2, a lifting system 43 is also shown, which in the embodiment is in the form of hydraulic cylinders.

FIG. 3 shows the shared platform 4 with the rack 3 raised above the ground via the lifting system 43. At the same time as the lifting system 43 raises rack 3, the second running gear 42 is extended, while the first running gear 41 is above the ground.

After the rack 3 is pushed into its initial position, the rack 3 is lowered by the hydraulic system of the shared platform 4 until it is placed on the ground and the second running gear 42 is retracted, which enables the movement of the shared platform on the first running gear 41 under the row of racks 1.

In a preferred embodiment, the lifting system 43 in the form of a hydraulic system and the second running gear 42 for transferring the rack 3 can be connected to each other, which means that the second running gear 42 is moved out and the rack 3 is raised by one hydraulic system.

In another embodiment of the invention, both running gears have independent drive systems.

FIG. 4 shows a shared platform 4 comprising a positioning system 44 whose arm is in the retracted position. FIG. 5 shows a shared platform 4 comprising a positioning system 44, whose arm is in the extended position. In an embodiment, the positioning arm is in the form of a telescopic cylinder. The rail 6 is placed in front of the positioning system 44 to support the rectilinear motion of the shared platform 4 and to support the arm of the system when the positioning system 44 is used.

The positioning system 44 is used for large dimensions and heavy goods stored on racks.

What is claimed:

1. A system of warehouse racks comprising:
   at least one working aisle having at least one rack (3); said at least one rack disposed perpendicularly to the at least one working aisle (2); said a least one rack is moveable to the at least one working aisle where goods are placed or removed from a selected place of storage in the at least one rack, and said at least one rack is moveable to an initial position; and
   a moveable shared, platform comprising a drive system, a power supply system, at least one running gear (41, 42), a rack lifting system (43) and a positioning system (44) extending or retracting the at least one rack (3);
   WHEREIN said movable, shared platform (4) moves the at least one rack (3) to the at least one working aisle (2) and returns said at least one rack (3) to its initial position by moving under at least one row of racks (1) perpendicularly to a direction of movement of the at least one rack (3), and parallel to the at least one working aisle (2), and
   WHEREIN the positioning system (44) of the movable, shared platform (4) lifts the at least one rack above the ground surface during movement to the at least one working aisle (2) and during its return to the initial position.

2. The warehouse rack system according to claim 1 WHEREIN one pair of legs of the at least one rack (3) is shorter and placed on a levelling element (5), while another pair of legs at the working aisle (2) is set on the ground.

3. The warehouse rack system according to claim 2 WHEREIN the levelling element (5) is a bracket arranged along the at least one row of racks (1).

4. The warehouse rack system according to claim 2 WHEREIN two racks (3) from adjacent rows (1) are arranged on the levelling element (5).

5. The warehouse rack system according to claim 2 WHEREIN a guide rail (6) for the shared platform (4) is placed in front of the levelling element (5).

6. The warehouse rack system according to claim 2 WHEREIN the levelling element (5) is a guide rail (6) of the shared platform (4).

7. The warehouse rack system according to claim 1 WHEREIN the power supply of the shared platform (4) is a battery, a supercapacitor, a power strip, a busbar, or power cable in the guide.

8. The warehouse rack system according to claim 1 WHEREIN the rack lifting system (43) is in the form of hydraulic cylinders, a crank, a knee, an eccentric, a screw mechanism, or a wheel with a gear rack.

9. The warehouse rack system according to claim 1 WHEREIN on the shared platform (4), there is a hydraulic pump driven by an electric motor.

10. The warehouse rack system according to claim 1 WHEREIN the shared platform (4) has two running gears (41, 42), of which a first running gear (41) allows the movement of the shared platform (4) under the at least one rack (3), while a second running gear (42) allows the at least one rack (3) to exit to the working aisle (2) and enter the initial position.

11. The warehouse rack system according to claim 1 further comprising wheels made of plastic or rubber or steel.

12. The warehouse rack system according to claim 1 WHEREIN the first running gear (41) enabling the movement of the shared platform under the racks is driven by a hydraulic motor.

13. The warehouse rack system according to claim 1 WHEREIN each of the running gears has a separate drive.

14. The warehouse rack system according to claim 1 WHEREIN the positioning system (44) of the shared platform (4) extending or retracting the at least one rack (3) is in the form of a hydraulic motor driving a sprocket wheel of the extending mechanism.

15. The warehouse rack system according to claim 1 WHEREIN the positioning system (44) of the shared platform (4) consists of a double-acting telescopic hydraulic cylinder.

16. The warehouse rack system according to claim 1 WHEREIN the shared platform (4) includes a distance sensor, a proximity sensor, a pressure sensor, and/or security scanners.

17. The warehouse rack system according to claim 1 WHEREIN safety scanners are mounted on extendable arms mounted on the shared platform (4) that slide outwards on both sides of the at least one rack (3) when the rack is pulled out and retract under the rack (3) when the at least one rack (3) is returned to its initial position.

* * * * *